US006347828B1

(12) United States Patent
Rapin et al.

(10) Patent No.: US 6,347,828 B1
(45) Date of Patent: Feb. 19, 2002

(54) ACTUATION MECHANISM FOR A TWO PIECE RETRACTABLE HARD-TOP ROOF FOR AN AUTOMOBILE

(75) Inventors: Robert R. Rapin, Macomb; Brian C. Baker, Bloomfield Township; James C. Fetterly, Rochester Hills; Thomas D. Vertin, Harrison Township, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/755,957

(22) Filed: Jan. 5, 2001

Related U.S. Application Data

(60) Provisional application No. 60/259,357, filed on Dec. 29, 2000.

(51) Int. Cl.$^7$ ................................................. B60J 7/08
(52) U.S. Cl. .............. 296/107.17; 296/108; 296/107.19
(58) Field of Search .................. 296/107.17, 107.08, 296/108, 107.2, 116, 107.19, 117

(56) References Cited

U.S. PATENT DOCUMENTS

| 4,776,630 A | 10/1988 | Fukutomi et al. ........... 296/107 |
| 5,195,798 A | 3/1993 | Klein et al. ................. 296/146 |
| 5,209,544 A | 5/1993 | Benedetto et al. .......... 296/107 |
| 5,806,912 A | 9/1998 | Ramaciotti et al. ......... 296/107 |

OTHER PUBLICATIONS

USSN 09/755875 filed Jan. 5, 2001 "Two Piece Retractable Hard–Top Roof for an Automobile" Rapin, et al.

*Primary Examiner*—Joseph D. Pape
(74) *Attorney, Agent, or Firm*—Laura C. Hargitt

(57) ABSTRACT

An actuation mechanism for a two piece retractable hard-top roof that interfaces with an automobile body assembly, the retractable hard-top roof having a forward roof component and a rearward roof component which are selectively conjoinable, wherein the actuation mechanism and its associated framework are not located in the passenger compartment, being generally located in a stowage compartment, and wherein a minimal fore-aft dimension is needed to accommodate storage of the retractable hard-top roof. The actuation mechanism is microprocessor controlled, and the rearward roof component is affixed at its rear end to the actuation mechanism. In a retraction operation, an affixment assembly detaches the forward roof component from the windshield trim, a rearward carriage retracts the conjoined roof to a first selected location, a joinder assembly detaches the forward roof component from the rearward roof component, and a forward carriage seats the forward roof component inside the stowage compartment whereat the forward roof component is juxtaposed the rearward roof component. A deployment operation is essentially a reverse of the aforesaid retraction operation. A tonneau cover assembly selectively covers a selected portion of the stowage compartment.

7 Claims, 10 Drawing Sheets

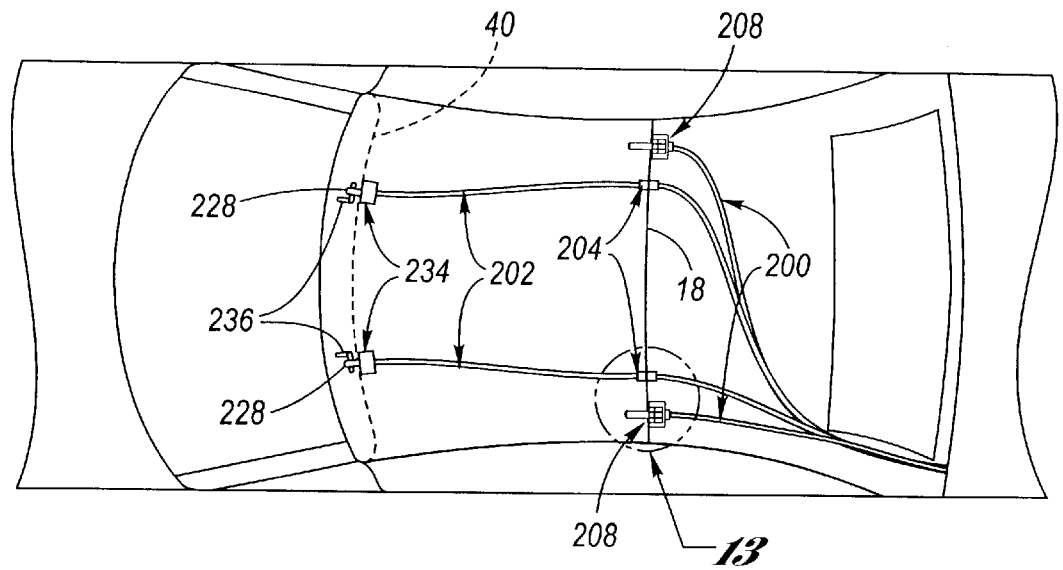
Fig. 12
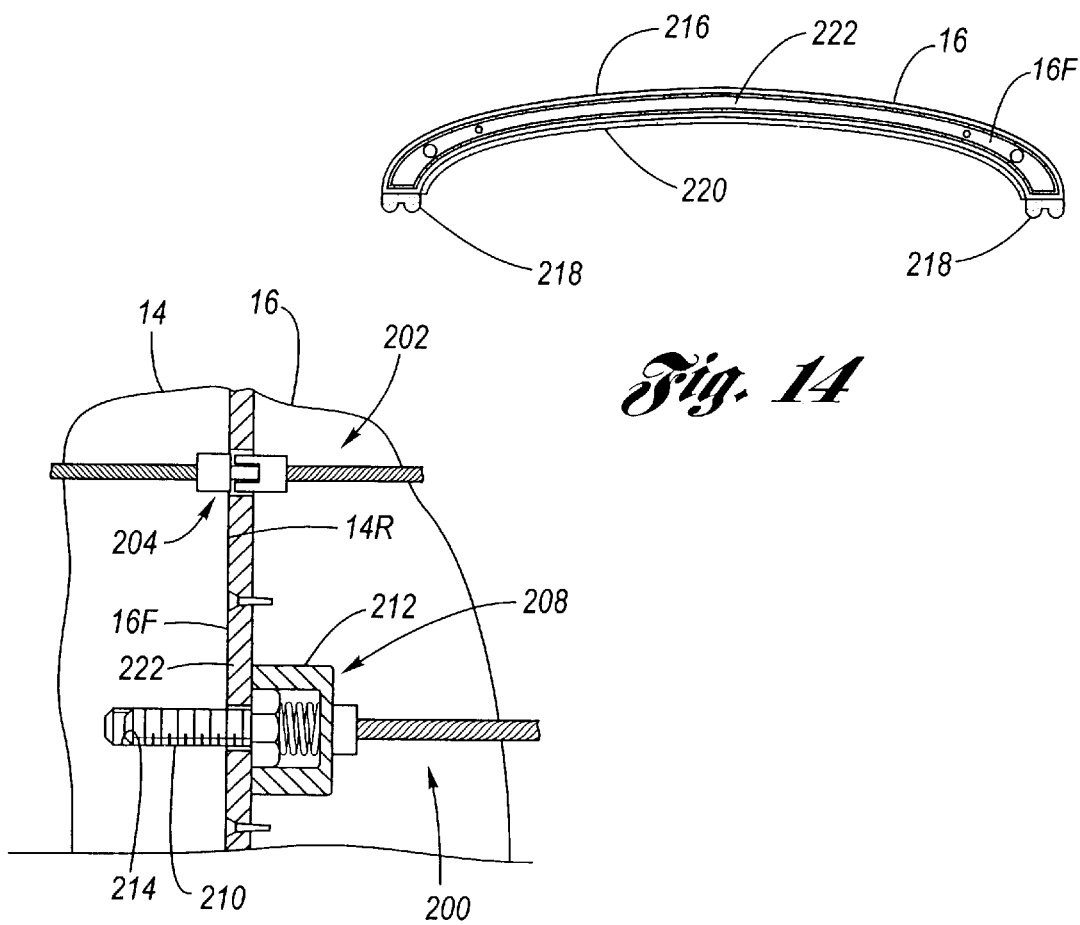
Fig. 14
Fig. 13

ACTUATION MECHANISM FOR A TWO PIECE RETRACTABLE HARD-TOP ROOF FOR AN AUTOMOBILE

This application claims benefit of provisional application Ser. No. 60/259,357 filed Dec. 29, 2000.

TECHNICAL FIELD

The present invention relates to automobiles, and more particularly to an automobile having a two piece retractable hard-top roof, wherein the actuation mechanism therefor is generally confined to a stowage compartment of the automobile, and wherein the retractable hard-top roof is stowed within the stowage compartment compactly in relation to the fore-aft dimension of the automobile.

BACKGROUND OF THE INVENTION

Automobile roof configurations may be broadly classed into "hard-tops" and "convertibles." Hard-tops feature a rigid roof member composed of, and immovably affixed to, the skin material of the automobile, as for example steel. Convertibles feature a soft and flexible roof material which is stretched taunt over the passenger compartment by a frame. The frame is retractably configured such that the frame may be both retracted into, and deployed outwardly from, a compartment rearward of the passenger seating area, wherein the roof material compliantly follows the frame during its respective retraction and deployment movements.

Convertibles provide a wonderful sense of driving enjoyment, but have several disadvantages. The soft, flexible material of the convertible roof can degrade over time due to environmental factors, and the material admits noise entry into the passenger compartment at a level much higher than that admitted by a hard-top roof.

The concept of an automobile having a hard-top roof featuring convertible functionality is presented in U.S. Pat. No. 5,806,912. In this disclosure, a two-piece hard-top roof is selectively retractable into a compartment rearward with respect to the passenger seating area. In this regard, a first roof panel is frameably connected with a second roof panel. During a retraction movement, the first roof panel nestably travels on a framework of the second roof panel, then the nested first and second roof panels pivotably retract into the compartment. Disadvantageously, this concept appears to require that frame components be conspicuously located in the passenger compartment, and the pivoting movement would likely result in a large loss of otherwise useable space in the fore-aft dimension of the automobile.

Accordingly, what remains needed in the art is a retractable hard-top roof which does not require framework be placed into the passenger compartment when the hard-top roof is deployed, and further requires a minimal fore-aft dimension to accommodate storage when the retractable hard-top roof is retracted.

SUMMARY OF THE INVENTION

The present invention is a two piece retractable hard-top roof for interfacing with an automobile body assembly, the retractable hard-top roof having a forward roof component and a rearward roof component, wherein an actuation mechanism and its associated framework are not located in the passenger compartment, being generally located in a stowage compartment, and wherein a minimal fore-aft dimension is needed to accommodate storage of the retractable hard-top roof.

The forward and rearward roof components are constructed, typically, of the material of which the skin of the automobile is constructed, as for example steel, and each includes an interior header. A front end of the forward roof component is selectively affixable to the windshield trim so that, when deployed, the retractable hard-top roof is affixably joined to the windshield trim. The rearward roof component includes a rear window, is affixed at its rear end to the actuation mechanism, and is selectively affixable at its front end to the rear end of the forward roof component. The mid-seam formed by the joiner between the rear end of the forward roof component and the front end of the rearward roof component is provided with appropriate gasketing to prevent air and water leakage into the passenger compartment, wherein, for example, the mid-seam may be located generally medially of the (conjoined) retractable hard-top roof.

The actuation mechanism (and its associated framework) is generally located within a stowage compartment located rearward of the passenger seating area. The actuation mechanism includes a forward roof component actuator assembly, a rearward roof component actuator assembly, a joinder assembly, an affixment assembly, and a tonneau cover actuator assembly, the nature of which will become apparent from the following brief operational description of the present invention.

Beginning with the retractable hard-top roof at its deployed position, the driver selects a dashboard switch which commences retraction of the retractable hard-top roof. The sequence of events thereafter are managed by a microprocessor which is interfaced with the actuation mechanism.

The affixment assembly first actuates, wherein a first pair of flexible linkages are caused to rotate by an interconnected affixment actuator, whereupon latches located at the front end of the forward roof component disconnect from latch seats in the windshield trim, thus freeing the retractable hard-top roof from the windshield.

Next, the rearward roof actuator assembly actuates, causing the (still conjoined) retractable hard-top roof to retract into the stowage compartment. This movement is effected by a rearward carriage actuator moving a rearward carriage which is affixed to the rear end of the rearward roof component while a pair of rearward guide tracks within the stowage compartment define the movement. This retraction continues until the rearward roof component reaches a semi-seated position receivably within the stowage component.

Now the joinder assembly actuates, wherein a second pair of flexible linkages are caused to rotate by an interconnected joinder actuator, whereupon threaded fasteners located at the front end of the rearward roof component unthread from threaded bores located at the rear end of the forward roof component, thus freeing the forward roof component from the rearward roof component. Simultaneously a forward carriage moves via a forward carriage actuator guideably on a pair of forward guide tracks, and thereupon grasps the forward roof component.

Upon the threaded fasteners becoming released, the rearward roof component is lowered from the semi-seated position to its seated position within the stowage compartment by the rearward actuator. The forward carriage holds the forward roof component as the rearward roof component separates therefrom, and the forward carriage actuator causes the forward carriage to forwardly jog, and then retract the forward roof component receivably into the stowage compartment, the movement being defined by the forward guide tracks. Upon the conclusion of this movement, the forward roof component is located parallel to, and juxtaposed just fore of, the rearward roof component, both being generally vertically oriented and compactly spaced within the stowage compartment in relation to the fore-aft dimension of the automobile.

Lastly, the tonneau cover actuator assembly is actuated, causing a vertically stowed tonneau cover to vertically rise, pivot, and then cover the opening of the stowage compartment.

The deployment of the retractable hard-top roof is essentially a reverse of the aforesaid retraction steps.

Accordingly, it is an object of the present invention to provide a two piece retractable hard-top roof for an automobile, having a forward roof component and a rearward roof component, wherein the actuation mechanism (inclusive of its framework) is generally confined to the stowage compartment, and wherein a minimal fore-aft dimension is needed to accommodate storage of the retractable hard-top roof.

This and additional objects, features and advantages of the present invention will become clearer from the following specification of a preferred embodiment.

BRIEF DESCRIPTION OF THE DRAWINGS

FIG. 12 is a top plan view of an automobile, showing examples of affixment and joinder linkages according to the present invention.

FIG. 13 is a detail view of joinder and affixment linkage connections, seen at circle 13 in FIG. 12.

FIG. 14 is an elevational view of the front end of the rearward roof component.

DESCRIPTION OF THE PREFERRED EMBODIMENT

Figure 1:
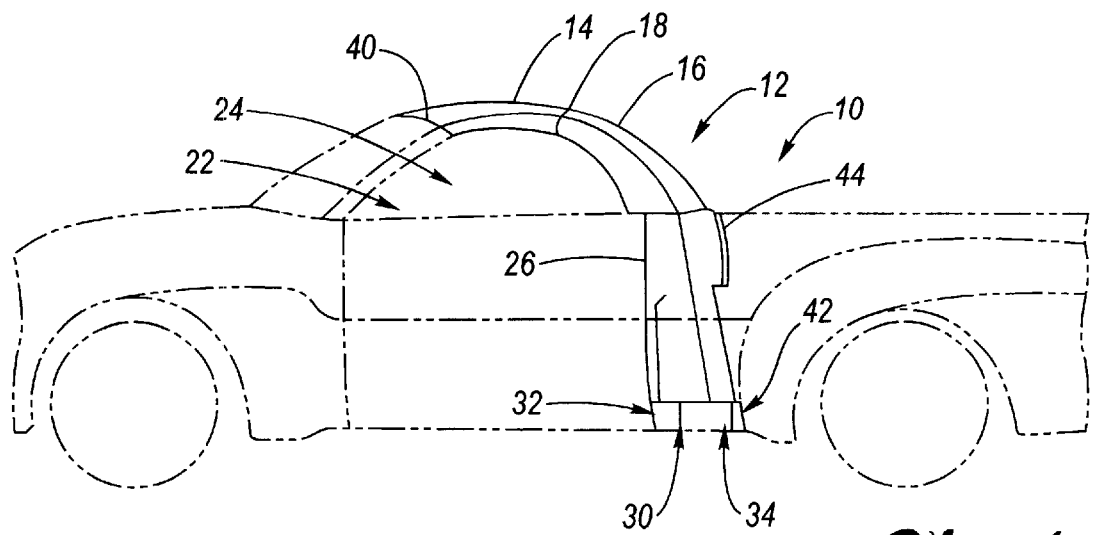
FIGS. 1 through 7 are schematic views depicting operation of the retractable hard-top roof according to the present invention, shown sequentially from the deployed position to the retracted position.
Figure 2:
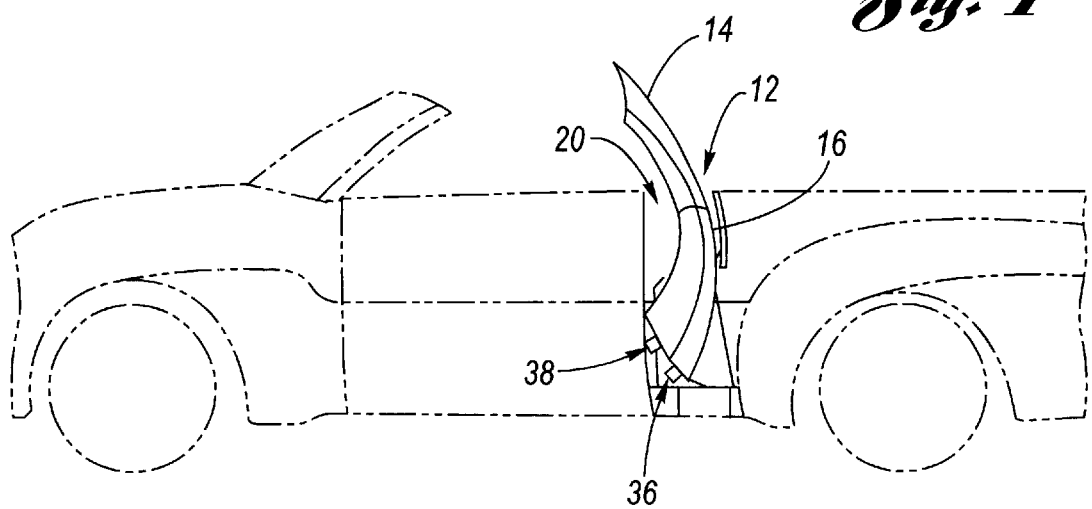
Figure 3:
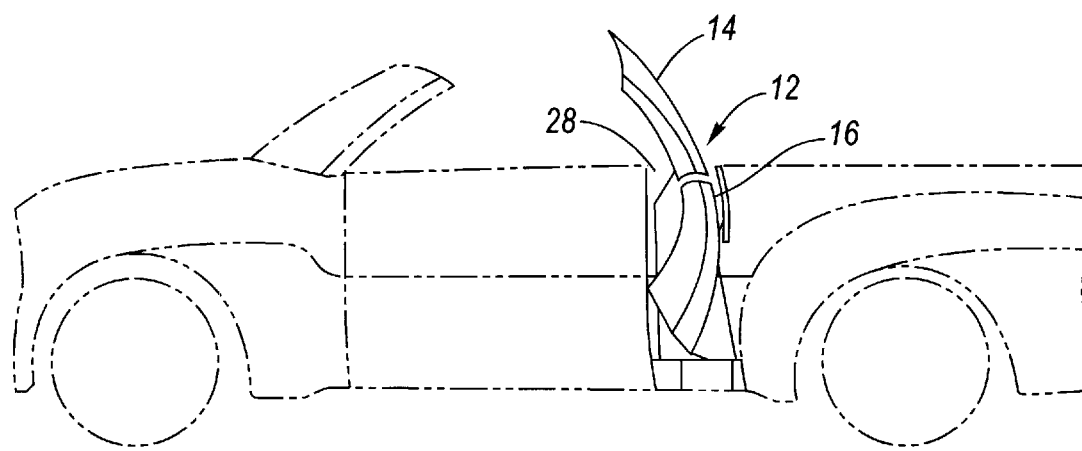
Figure 4:
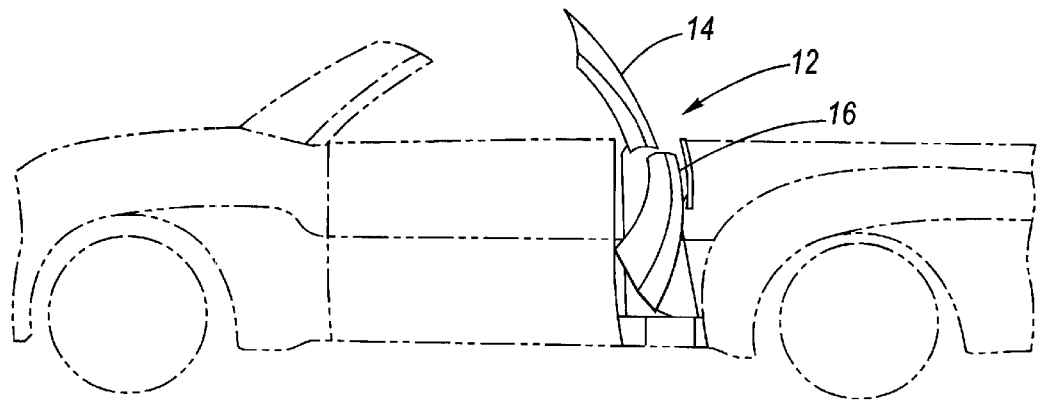
Figure 5:
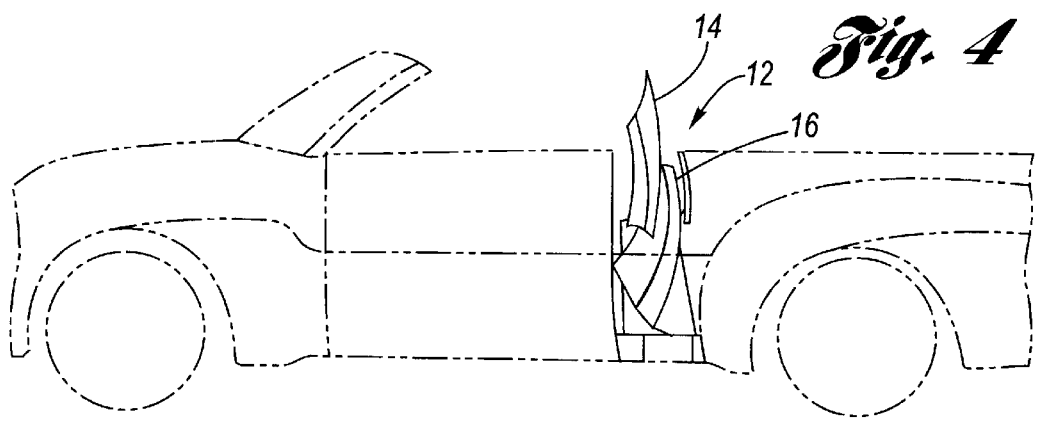
Figure 6:
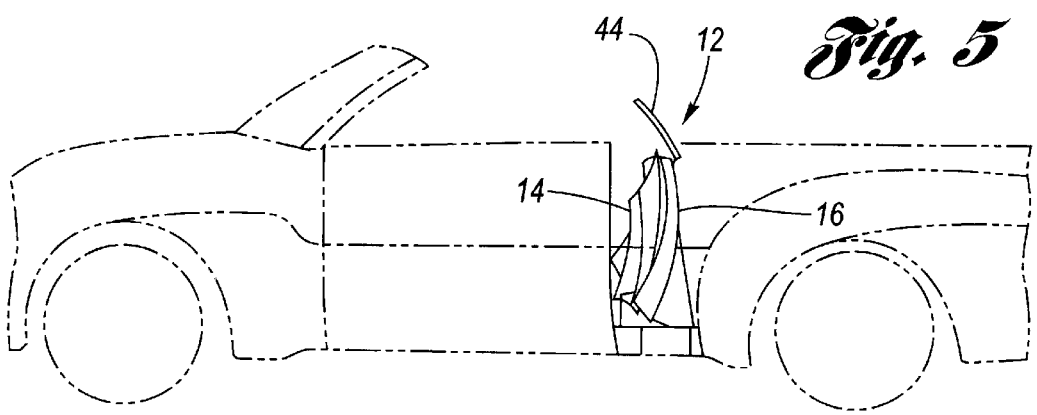
Figure 7:
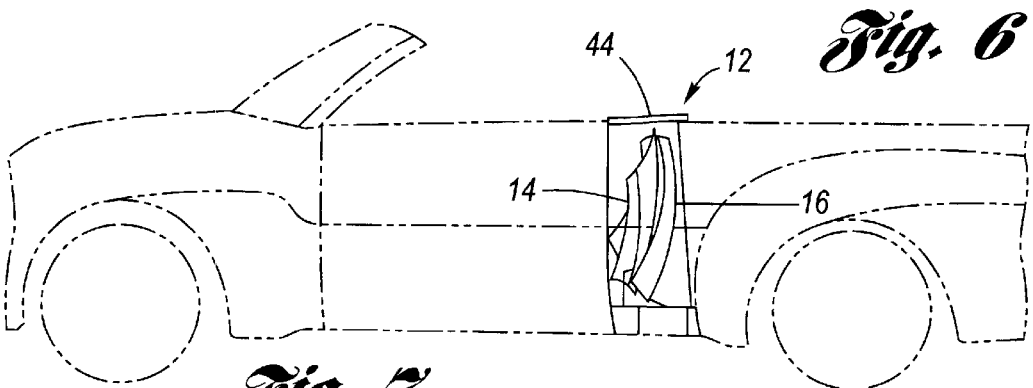

Referring now to the Drawing, FIGS. 1 through 7 depict an example of an automobile 10 in the form of an automobile body assembly equipped with a retractable hard-top roof 12 according to the present invention. The automobile 10 may be any type of motor vehicle, such as for example a passenger car, a pick-up truck, a sport utility vehicle; however, the preferred automobile has a rear portion that has a lower height than the roof, for example a two or four door car with a trunk lid located below the height of the rear window, or a pick-up truck.

The retractable hard-top roof 12 is two component, having a forward roof component 14 and a rearward roof component 16. The forward and rearward roof components 14, 16 are composed of a rigid material, as for example steel, and each have an interior header. The forward and rearward roof components further have, as necessary, a sealing interface for side windows of the automobile.

The forward and rearward roof components 14, 16 are conjoined at a mid-seam 18 into a single, rigid unit for deployment and mutually separated thereat for stowage in a stowage compartment 20 located rearwardly of the seating area 22 of the passenger compartment 24 of the automobile 10. The stowage compartment 20 is preferably demarcated from the seating area 22 by a bulkhead 26, and includes a stowage compartment opening 28 through which the forward and rearward roof components 14, 16 pass with respect to the stowage compartment.

An actuation mechanism 30 provides microprocessor controlled deployment and retraction functions of the retractable hard-top roof 12, wherein frame and actuator components thereof are not exposed or visible to occupants within the passenger compartment. The actuator mechanism 30 includes a forward roof component actuator assembly 32 for selectively moving the forward roof component, a rearward roof component actuator assembly 34 for selectively moving the rearward roof component, a joinder assembly 36 for selectively conjoining the forward and rearward roof components at the mid-seam, an affixment assembly 38 for selectively affixing the forward roof component to windshield trim 40, and a tonneau cover actuator assembly 42 for providing selective covering of the stowage compartment opening by a tonneau cover 44.

An overview of the retraction and deployment movements of the retractable hard-top roof 12 is depicted sequentially from FIG. 1 through FIG. 7, and transpires as generally recounted hereinabove (see the Summary of the Invention).

Figure 8:
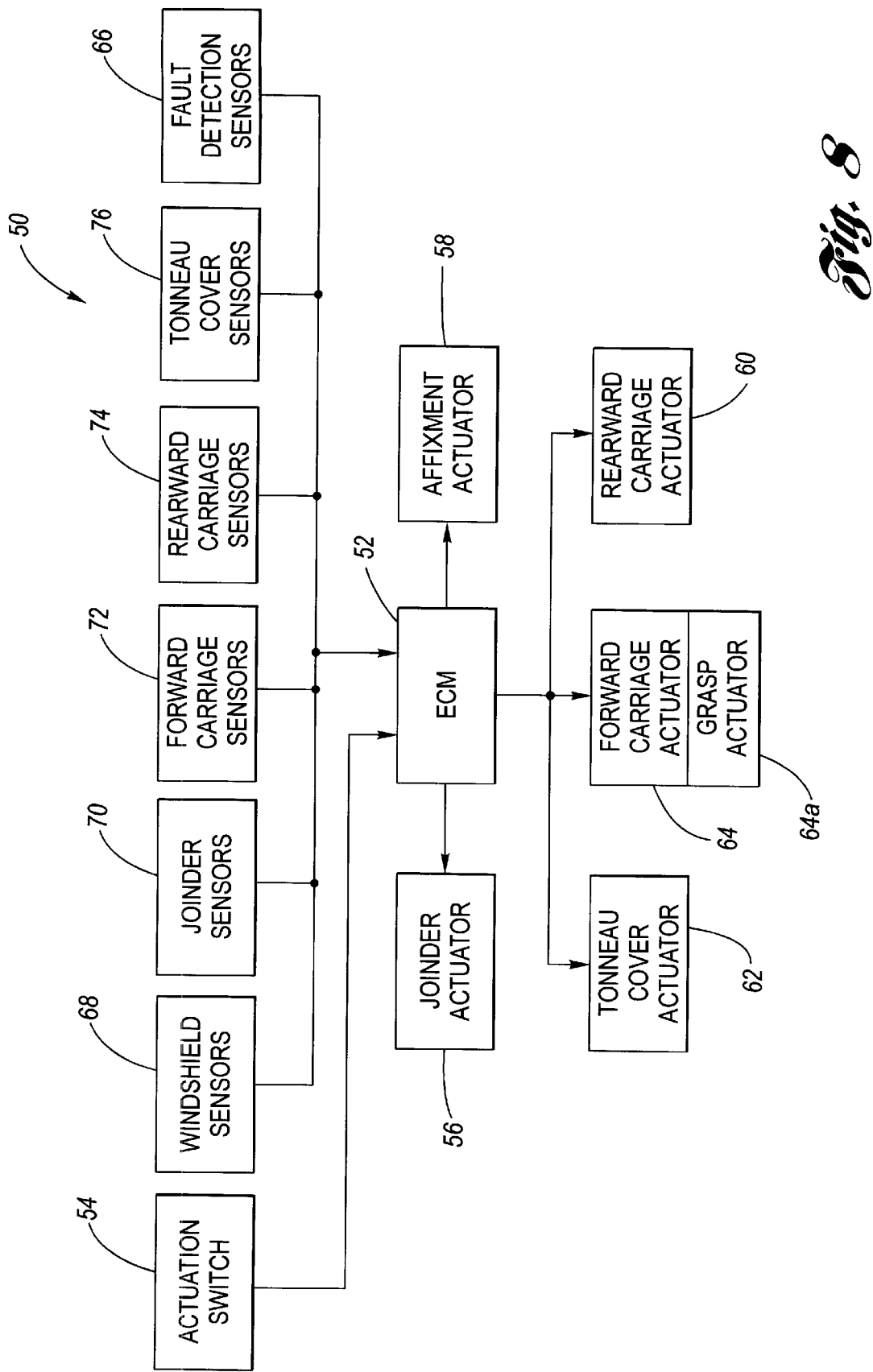
FIG. 8 is a schematic view of a microprocessor control system according to the present invention.

Referring now to FIG. 8, a microprocessor control system 50 for effectuating retraction and deployment of the forward and rearward roof components 14, 16 will be detailed.

An electronic control module (ECM) 52 is preprogrammed and/or programmable with instructions for providing retraction and deployment functions of the forward and rearward roof components. An actuation switch 54, which is typically dashboard placed, provides a driver selectable deploy or retract actuation start command which is received and interpreted by the ECM 52. The ECM 52 thereupon provides programmed signals to a joinder actuator 56 of the joinder assembly, an affixment actuator 58 of the affixment assembly, a rearward carriage actuator 60 of the rearward roof component actuator assembly, a tonneau cover actuator 62 of the tonneau cover actuator assembly, and a forward carriage actuator 64 of the forward roof component actuator assembly which assembly includes a forward roof component grasp mechanism actuated by a grasp actuator 64a that is also responsive to the signals from the ECM.

As the ECM 52 signals the various actuators, the ECM continuously monitors fault detection sensors 66 and, should a fault be detected, provides a preprogrammed response appropriate to the detected fault. Detected faults are processed by the ECM according to a preprogrammed fault routine, which, for example, may result in a system-wide preprogrammed shut-down in the event of a major fault, or mere recordation of a fault code for a technician to later take note of in the event of a minor fault. The fault routine, for example, could resolve a binding problem as follows: upon detection of a binding fault, the actuator involved may be signaled to stop, reverse slightly, and then proceed slowly forward again so long as binding forces remain below a predetermined threshold.

Various other sensors are provided for the ECM 52 to monitor proper function of the retraction and deployment movements of the forward and rearward roof components. For example, windshield affixment sensors 68 sense whether or not the forward roof panel is affixed to the windshield trim, and may further detect the tightness of the affixment; joinder sensors 70 sense whether or not the forward rood component is conjoined to the rearward roof component, and may further detect the tightness of the joinder; forward carriage sensors 72 detect the position of the forward roof component within the stowage compartment, as well as the grasping thereto by the grasping mechanism; rearward carriage sensors 74 detect the position of the rearward roof component; and tonneau cover sensors 76 detect the position of the tonneau cover.

Figure 9:
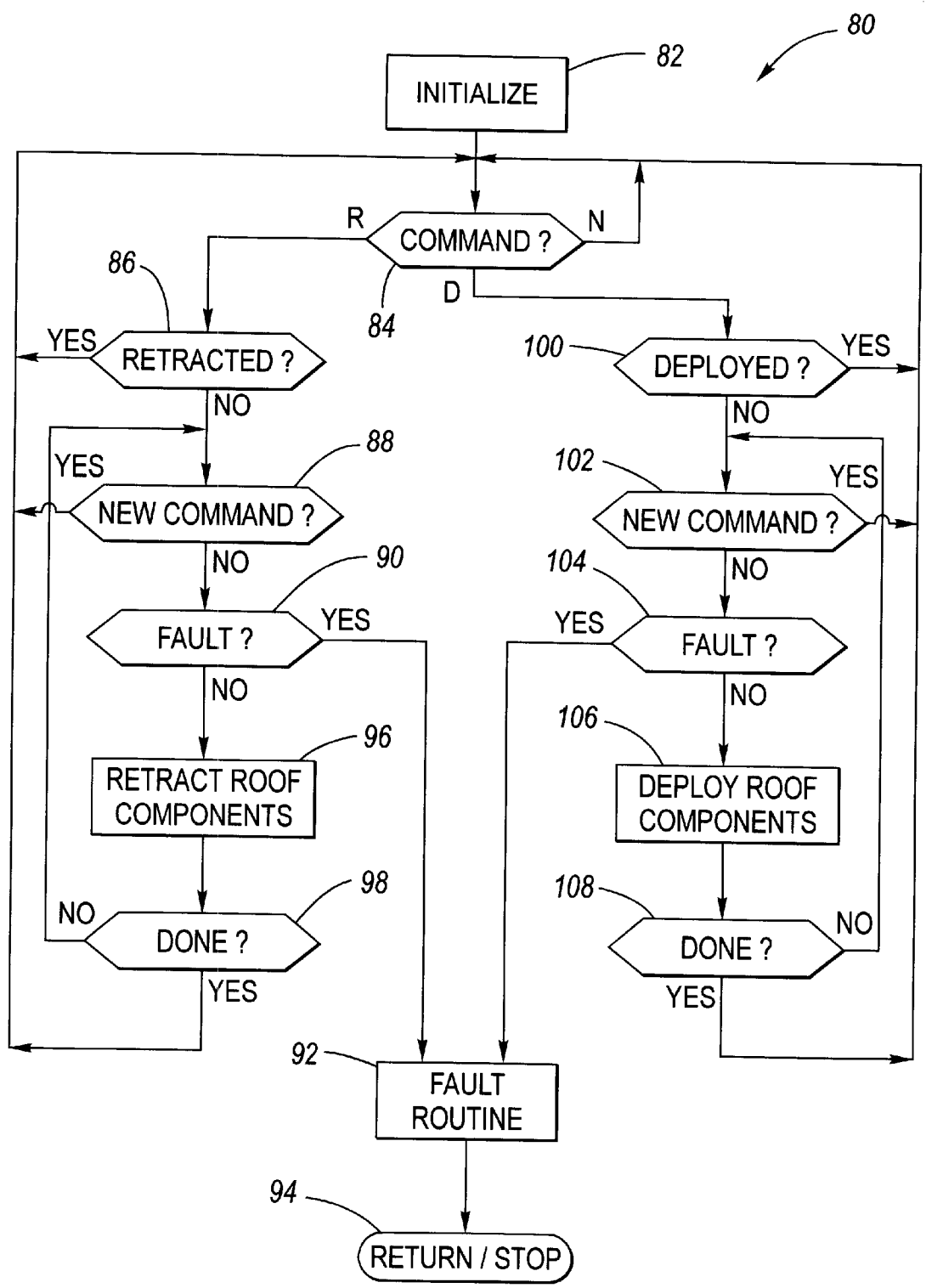
FIG. 9 is a flow chart of the microprocessor control system event sequence according to the present invention.

Referring next to FIG. 9, a flow diagram 80 of a program of the ECM 52 will be detailed. At block 82 the program is initialized, typically for example, when the automobile ignition key is turned in the ignition switch to an "on" position. The program then awaits an actuation command from the actuation switch 54. At decision block 84, an actuation of the actuation switch is interpreted as a deployment command (D) or a retraction command (R), otherwise if no actuation of the switch occurs, the program waits.

If a retraction command is received, the program inquires at decision block 86 whether the forward and rearward roof components are already retracted. If yes, the program waits; if no, the program proceeds. The program inquires at decision block 88 whether a new command has been detected (that is, has the driver now decided instead to deploy the forward and rearward roof components). If yes, the program returns to decision block 84 and then processes the command. If no, the program advances to decision block 90 and thereat inquires if a fault has been detected. If the inquiry at decision block 90 is yes, the program advances to the fault routine block 92 and thereat performs a fault redress routine appropriate to the detected fault. Thereafter at block 94, the program returns, stops or jumps to an appropriate juncture in the program as determined by the fault routine. If the inquiry at decision block 90 is no, then the program advances to execution block 96, whereat the forward and rearward roof components are retracted. The program periodically inquires whether the retraction process has completed at decision block 98. If the retraction process has not yet completed, then program again makes inquiries at decision blocks 88 and 90; however, if the retraction process has concluded, then the program returns to decision block 84 to await a next command.

If a deployment command is received, the program inquires at decision block 100 whether the forward and rearward roof components are already deployed. If yes, the program waits; if no, the program proceeds. The program inquires at decision block 102 whether a new command has been detected (that is, has the driver now decided instead to retract the forward and rearward roof components). If yes, the program returns to decision block 84 and then processes the command. If no, the program advances to decision block 104 and thereat inquires if a fault has been detected. If the inquiry at decision block 104 is yes, the program advances to the fault routine block 92 and thereat performs a fault redress routine appropriate to the detected fault. Thereafter at block 94, the program returns, stops or jumps to an appropriate juncture in the program as determined by the fault routine. If the inquiry at decision block 104 is no, then the program advances to execution block 106, whereat the forward and rearward roof components are deployed. The program periodically inquires whether the deployment process has completed at decision block 108. If the deployment process has not yet completed, then program again makes inquiries at decision blocks 102 and 104; however, if the deployment process has concluded, then the program returns to decision block 84 to await a next command.

Figure 10:
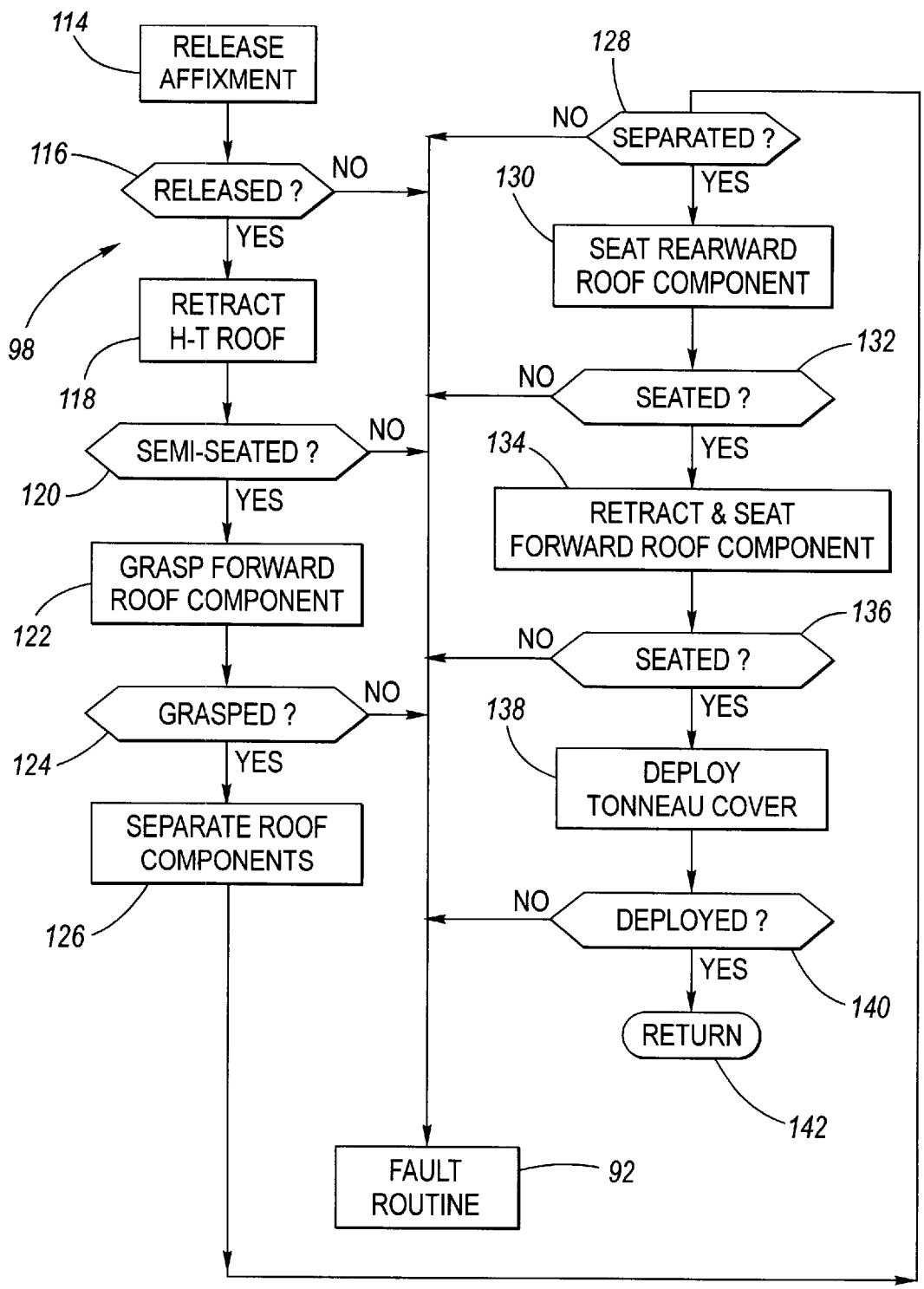
FIG. 10 is a retract event sequence flow chart of the microprocessor control system according to the present invention.

Referring now to FIG. 10, a retract event sequence flow chart of execution block 96 of the flow diagram 80 will be detailed.

The program, at execution block 114, signals actuation of the affixment actuator so as to thereby release affixment of the front end of the forward roof component with respect to the windshield trim, as for example by rotating latches out of latch seats. The program then inquires at decision block 116 whether sensors have detected a release. If not, the program advances to the fault routine at execution block 92; otherwise the program advances to execution block 118. At execution block 118, a signal is sent to the rearward carriage actuator to loweringly retract the conjoined forward and rearward roof components (that is, to retract as a single unit) so that the rearward roof component reaches a semi-seated location. The program then inquires at decision block 120 whether sensors report that the rearward roof component has stopped at the semi-seated location. If not, the program advances to the fault routine at execution block 92; otherwise the program advances to execution block 122. At execution block 122, the forward carriage actuator and the grasp actuator are signaled by the program to engage the forward roof component. For example, threaded studs are brought into alignment with threaded bores at the interior of the forward roof component by the forward carriage actuator, then threaded thereinto by the grasp actuator. The program then inquires at decision block 124 whether sensors report that the forward roof component is grasped. If not, the program advances to the fault routine at execution block 92; otherwise the program advances to execution block 126. At execution block 126 the program signals the joinder actuator to actuate so as to free the forward roof component from the rearward roof component. For example, threaded studs of the rearward roof component are caused to unthread from threaded bores of the forward roof component. The program then inquires at decision block 128 whether sensors report that the forward roof component is detached from the rearward roof component. If not, the program advances to the fault routine at execution block 92; otherwise the program advances to execution block 130. At execution block 130 the program signals the rearward carriage actuator to seat the rearward roof component. At decision block 132 the program inquires whether sensors report the rearward roof component is seated. If not, the program advances to the fault routine at execution block 92; otherwise the program advances to execution block 134. At execution block 134 the program signals the forward carriage actuator to retract and seat the forward roof component. At decision block 136 the program inquires whether sensors report the forward roof component is seated. If not, the program advances to the fault routine at execution block 92; otherwise the program advances to execution block 138. At execution block 138 the program signals the tonneau cover actuator to deploy the tonneau cover so as to cover the opening of the stowage compartment. At decision block 140 the program inquires whether sensors report the tonneau cover is deployed. If not, the program advances to the fault routine at execution block 92; otherwise the program advances to block 142 and returns.

Figure 11:
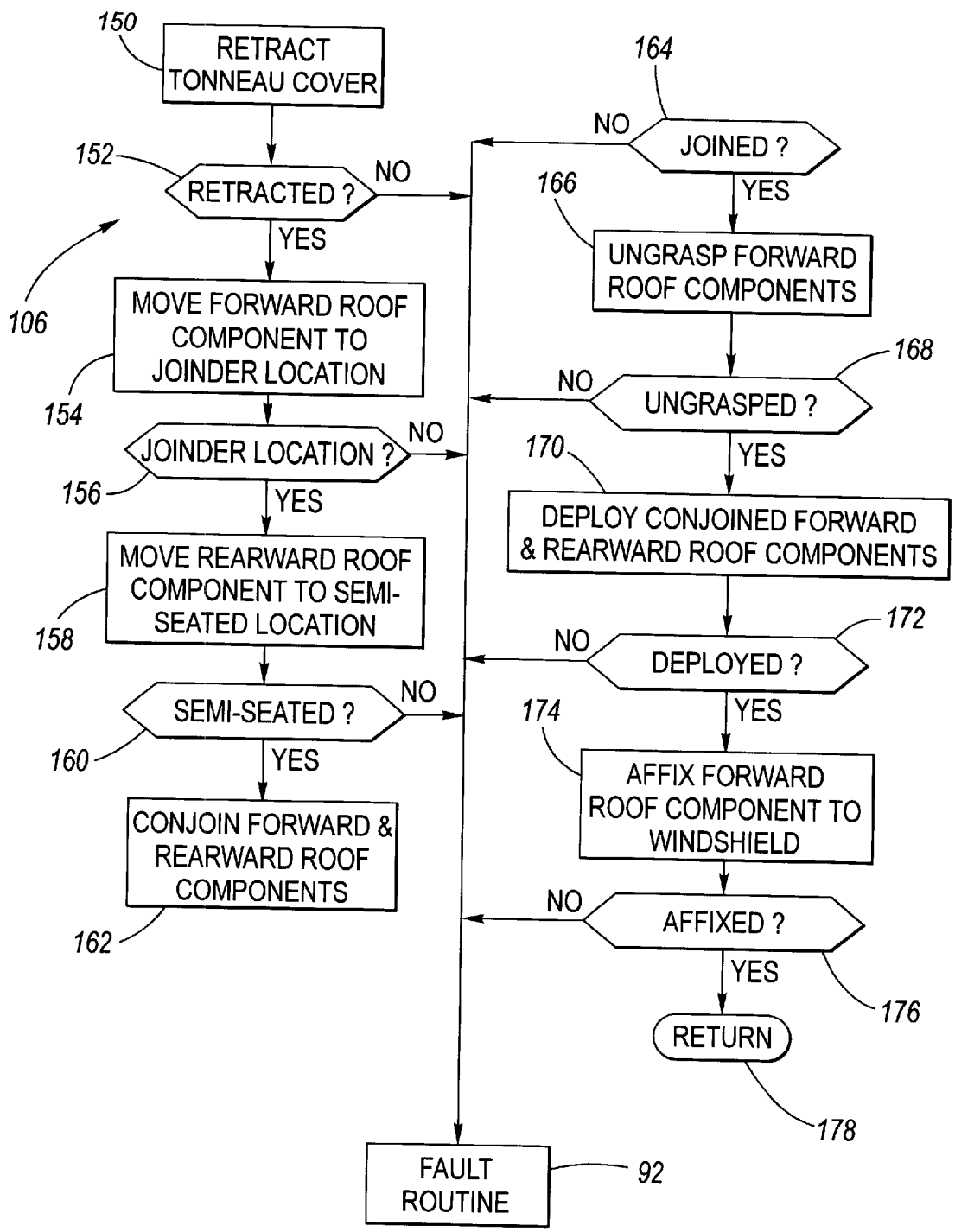
FIG. 11 is a deploy event sequence detail flow chart of the microprocessor control system according to the present invention.

Referring now to FIG. 11, a deploy event sequence flow chart of execution block 106 of the flow diagram 80 will be detailed.

At execution block 150 the program signals the tonneau cover actuator to retract the tonneau cover so as to uncover the opening of the stowage compartment. At decision block 152 the program inquires whether sensors report the tonneau cover is stowed. If not, the program advances to the fault routine at execution block 92; otherwise the program advances to execution block 154. At execution block 154 the program signals the forward carriage actuator to advance the forward roof component to a joinder location. At decision block 156 the program inquires whether sensors report the forward roof component is at the joinder location. If not, the program advances to the fault routine at execution block 92; otherwise the program advances to execution block 158. At execution block 158 the program signals the rearward carriage actuator to advance the rearward roof component to the semi-seated location. At decision block 160 the program inquires whether sensors report the rearward roof component is at the semi-seated location (whereat the rear end of the forward roof component is adjoining the front end of the rearward roof component). If not, the program advances to the fault routine at execution block 92; otherwise the program advances to execution block 162. At execution block 162 the program signals the joinder actuator to actuate so as to join the forward roof component to the rearward roof component. Per the above example, threaded studs of the rearward roof component are caused to thread into threaded bores of the forward roof component so as to make them a single rigid unit, tightly sealed at the mid-seam. The program then inquires at decision block 164 whether sensors report that the forward roof component is joined to the rearward roof component. If not, the program advances to the fault routine at execution block 92; otherwise the program advances to execution block 166. At execution block 166, the grasp actuator is signaled by the program to disengage from the forward roof component. Per the above example, the threaded studs are unthreaded from the threaded bores by the grasp actuator. The program then inquires at decision block 168 whether sensors report that the forward roof component is ungrasped. If not, the program advances to the fault routine at execution block 92; otherwise the program advances to execution block 170. At execution block 170, a signal is sent to the rearward carriage actuator to raisingly deploy the conjoined forward and rearward roof components (that is, to deploy as a single unit) so that the front end of the forward roof component reaches the windshield trim. The program then inquires at decision block 172 whether sensors report that the front end of the forward roof component has reached a predetermined spacing from the windshield trim. If not, the program advances to the fault routine at execution block 92; otherwise the program advances to execution block 174. The program, at execution block 174, signals actuation of the affixment actuator so as to thereby affix the front end of the forward roof component to the windshield trim, as per the above example by rotating the latches into the latch seats. The program then inquires at decision block 176 whether sensors have detected affixment. If not, the program advances to the fault routine at execution block 92; otherwise the program advances to block 178 and returns.

Turning attention now to structures for carrying out the aforesaid functions, FIGS. 12 through 20B depict structural examples for exemplar purposes only, since commercially practicable structures would be chosen and configured to suit a particular automobile type and style, and accordingly may be operatively and structurally quite different from that shown and described hereinbelow. The affixment linkage 202 is located entirely within the forward and rearward roof components 14, 16, and the joinder linkage 200 is located entirely within the rearward roof component 16, and completely unseen to occupants.

FIG. 12 depicts a set of joinder linkages 200 and a set of affixment linkages 202, each utilizing, preferably, flexible cables capable of transmitting therealong rotational torque. The set of affixment linkages 202 includes a pair of affixment couplings 204 for transmitting rotational torque from one side of the mid-seam 18 to the other side of the mid-seam (see detail at FIG. 13).

Turning attention firstly to the hereinabove mentioned joinder assembly 36, the joinder linkages 200 are each connected, respectively, to a joinder actuator 56, shown at FIG. 19, for providing rotative torque thereto. As shown at FIG. 13, each joinder linkage terminates in a joinder mechanism 208, including a (preferably spring loaded) threaded joinder stud 210 and a joinder drive socket 212 connected to its respective joinder linkage. In operation to conjoin the front end 16F of the rearward roof component 16 to the rear end 14R of the forward roof component 14, the joinder actuator 56 causes the joinder linkages 200 to rotate, causing the joinder drive sockets 212 to rotate, and, in turn, causing the joinder studs 210 to thread seatably into respective threaded joinder bores 214 of the rear end 14R. To release the conjoinder, the joinder actuator is reversed. Other equally preferred affixment assemblies may be used, the foregoing description being illustrative.

Referring to FIG. 14, the forward end 16F of the rearward roof component 16 has a gasket 216 for sealing against the rear end 14R (see FIG. 13) of the forward roof component 14, and further has side window seals 218 and a header 220. A removable front panel 222 provides service access to the joinder mechanisms 208.

Figure 15:
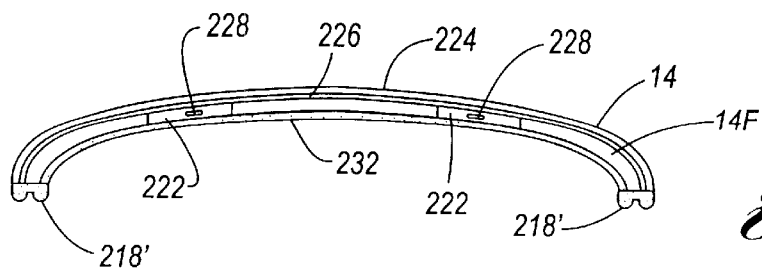
FIG. 15 is an elevational view of the front end of the forward roof component.

Referring to FIG. 15, the forward end 14F of the forward roof component 14 has an overhang 224, a gasket 226, a pair of L-shaped latches 228, each projecting through a removable service plate 230, a header 232, and preferably has side window seals 218'.

Figure 16:
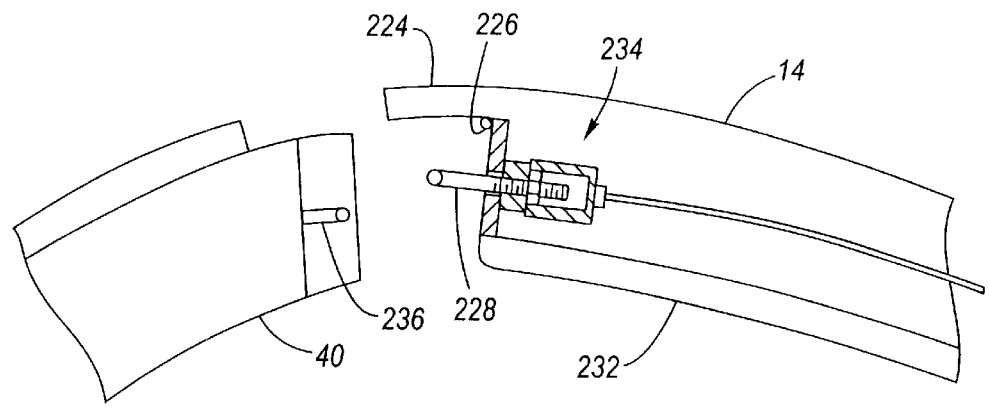
FIGS. 16 and 17 are partly sectional views of the latch mechanism showing a sequence of latching steps according to the present invention.
Figure 17:
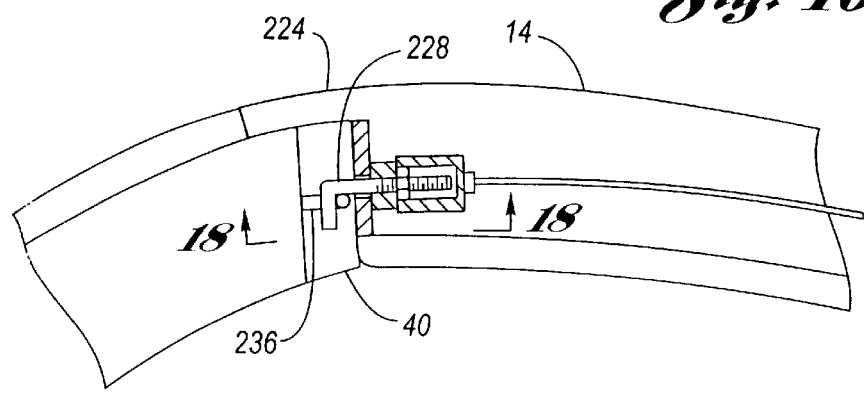
Figure 18:
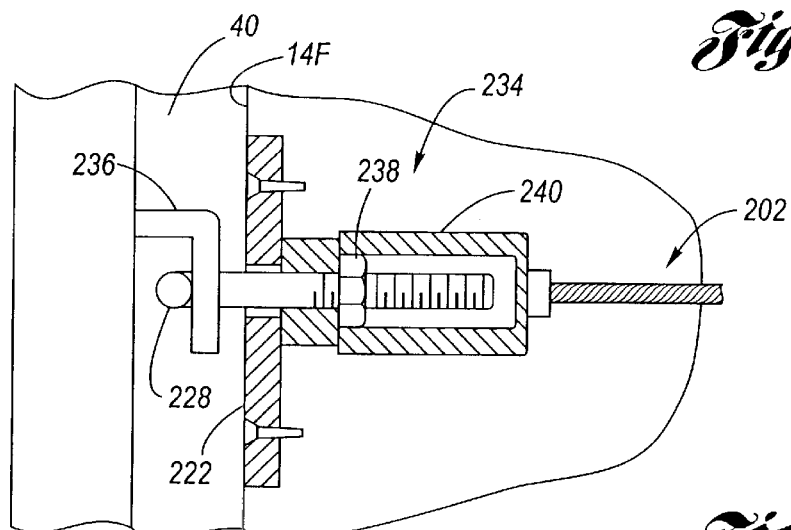
FIG. 18 is a partly sectional view seen along line 18—18 of FIG. 17.

Turning attention now to the aforementioned affixment assembly 38, each affixment linkage terminates in a latch mechanism 234, each respectively being selectively latchable, via its latch 228, onto a hook 236 (latch seal) of the windshield trim 40. The affixment assembly 38 includes further an affixment actuator 58 (see FIG. 19) connected to a respective end of each affixment linkage. Each latch mechanism includes the above mentioned latch 228, wherein the latch has a threaded section, a latch nut 238 which is threaded thereon, and a latch socket 240 which is connected to an end of a respective affixment linkage 202. As shown at FIGS. 16 through 18, when the front end of the forward roof component 14 is proximate the windshield trim, the latch 228 clears the hook 236. As the affixment actuator 58 actuates, the latch socket 240 causes the latch 228 to turn ninety degrees into an interfering relationship with the hook 236, and the latch nut 238 is caused to thread on the threaded section of the latch, causing the latch to pull tight against the hook and thereby affixingly seal the front end 14F of the forward roof component to the windshield trim 40. To release the affixment, the affixment actuator is reversed, the latch pivoting in the opposite direction ninety degrees to again be clear of the hook. Alternatively, the affixment linkages could be a single linkage at the affixment actuator with one affixment coupling, then forking into two linkages within the forward roof component. As an example of another alternative of the affixment assembly, a latch mechanism may be incorporated in the windshield trim, thereby obviating placement of an affixment linkage in the forward and rearward roof components.

Figure 19:
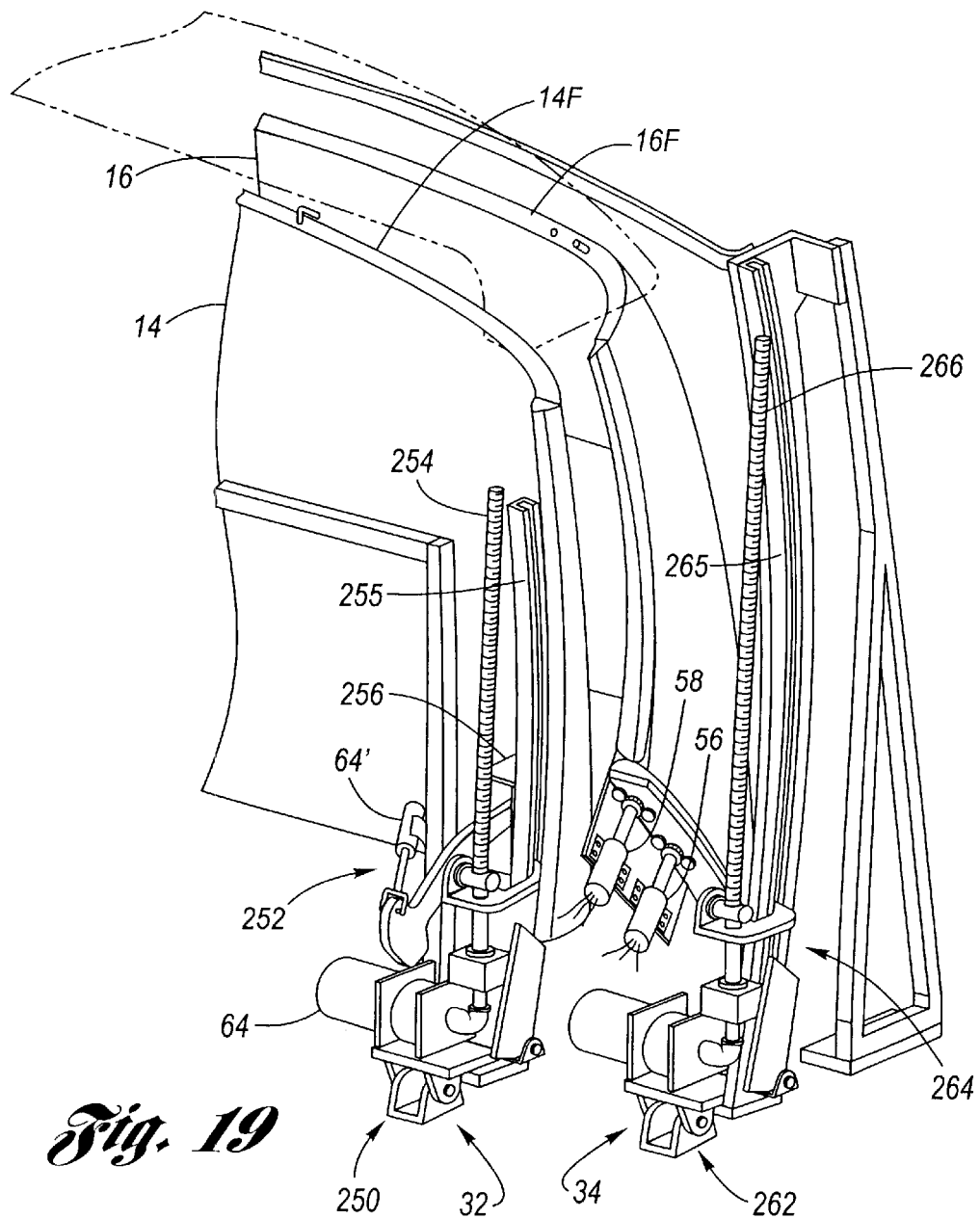
FIG. 19 is a broken-away, perspective view of an example of an actuation mechanism according to the present invention for actuating the forward and rearward roof components.
Figure 19A:
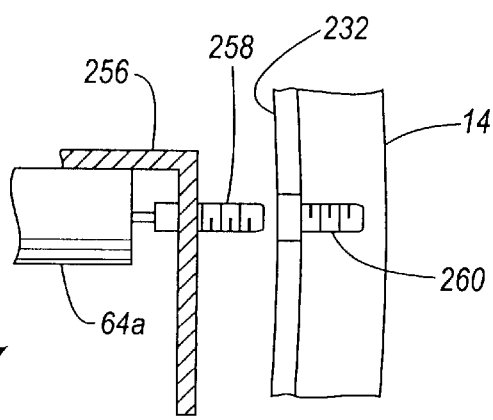
FIG. 19A is a detail, partly sectional view of a grasp actuator of the actuation mechanism for grasping the forward roof component.

Turning attention now to FIGS. 19 and 19A, an illustration of the aforementioned actuator mechanism 30 will be exemplified with regard to the forward and rearward roof actuator assemblies 32, 34.

With regard firstly to the forward roof actuator assembly 32, a pivot mount 250 provides a base for a forward carriage 252. The forward carriage actuator 64, which is connected with the pivot mount 250, provides rotation to a ball-screw 254 which is threadably engaged with the forward carriage 252 so as to raise and lower the forward carriage depending on the direction of rotation of the ball-screw in guidance by left and right forward guide tracks 255. A secondary forward carriage actuator 64' is connected with the forward carriage 252 and provides the aforementioned jogging movement of the forward roof component 14. The grasp actuator 64a, depicted in FIG. 19A, is connected to a frame member 256 of the forward carriage 252, and includes a threaded grasp stud 258 which threads into a threaded grasp bore 260 at the headliner side of the forward roof component 14.

With regard next to the rearward roof actuator assembly 34, a second pivot mount 262 provides a base for a rearward carriage 264. The rearward carriage actuator 60, which is connected with the second pivot mount 262, provides rotation to a second ball-screw 266 which is threadably engaged with the rearward carriage 264 so as to raise and lower the rearward carriage depending on the direction of rotation of the second ball-screw in guidance by left and right rearward guide tracks 265. The rear end 16R of the rearward roof component 14 is connected to the rearward carriage 264.

Figure 20A:
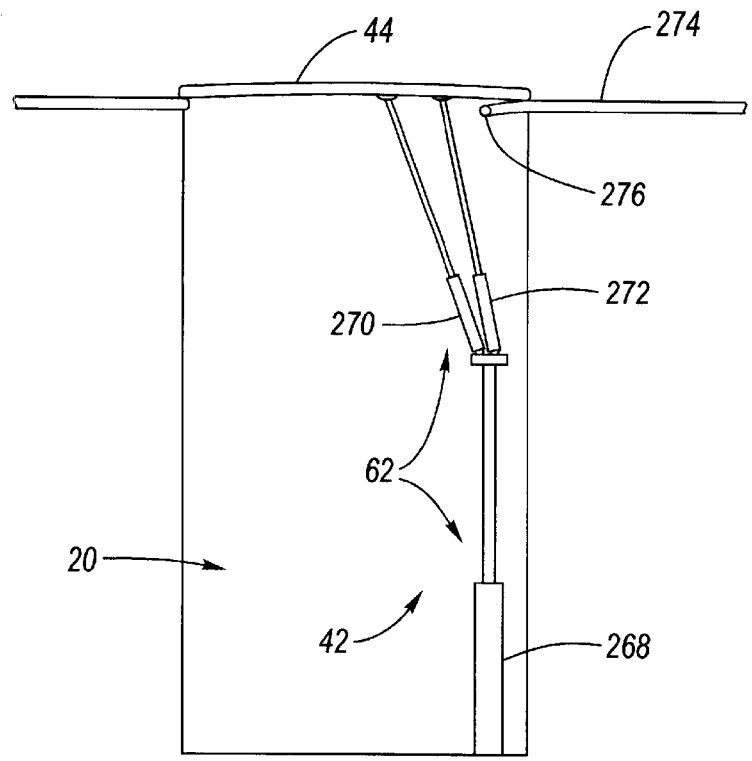
FIGS. 20A and 20B depict a tonneau cover actuator assembly of the actuation mechanism, showing deployed and stowed locations of the tonneau cover.
Figure 20B:
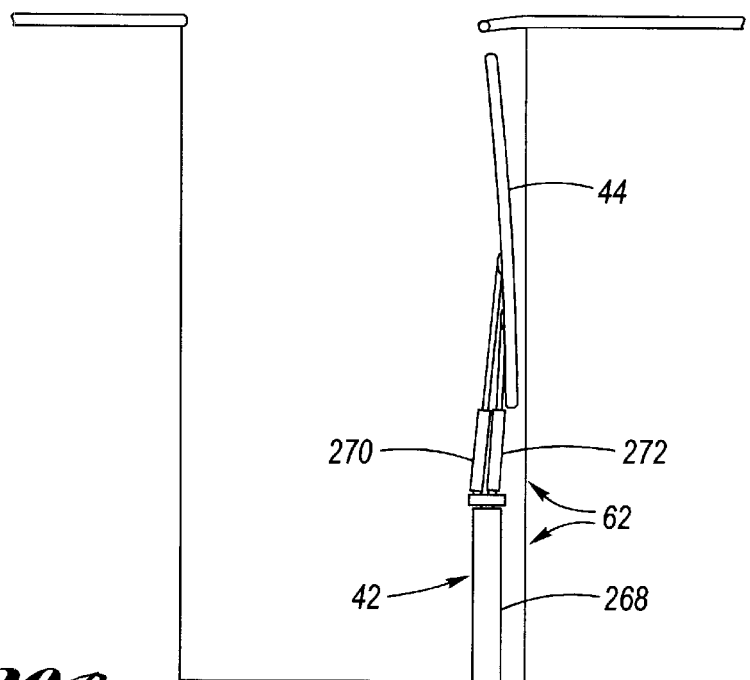

Referring now to FIGS. 20A and 20B, the tonneau cover actuator assembly 42 of the actuator mechanism 30 will be exemplified. The tonneau cover actuator 62 includes a primary tonneau cover actuator 268 connected to first and second secondary tonneau cover actuators 270, 272 which are connected to the tonneau cover 44 in a mutually spaced apart relation. Advance and retract actuation of the primary tonneau cover actuator 268 raises and lowers the tonneau cover 44. By, for example, advancing the first secondary tonneau cover actuator 270 while simultaneously retracting the second secondary tonneau cover actuator 272 (or vice versa), the tonneau cover is made to pivot. Selective actuation of the primary tonneau cover actuator 268 in combination with independent selective actuation of the first and second secondary tonneau cover actuators 270, 272, provide the aforesaid deploy and retract movements of the tonneau cover 44. It is to be noted that the foregoing description is merely illustrative, and other mechanisms accomplishing the tonneau cover movements would also be preferred.

When deployed, the rearward roof component 16 sealably adjoins the rear deck panel 274 via a seal 276. An actuator operated interior trim cover may be provided to close the stowage compartment within the passenger compartment; alternatively the bulkhead 26 may be pivotally mounted and moved to provide closure via an actuator.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An apparatus including an actuation mechanism and a two piece retractable hard-top roof for an automobile, the roof including a forward roof component having a forward roof component front end and a forward roof component rear end and a rearward roof component having a rearward roof component front end and a rearward roof component rear end, the automobile having a fore-aft dimension and a windshield having windshield trim, said actuation mechanism comprising:

a rearward carriage connected with said rear end of said rearward roof component;

at least one rearward guide track, said rearward carriage being connected to said at least one rearward guide track in a movably guided relationship;

a rearward carriage actuator for selectively moving said rearward carriage;

a forward carriage selectively connectable to said forward roof component;

at least one forward guide track, said forward carriage being connected to said at least one forward guide track in a movably guided relationship;

a forward carriage actuator for selectively moving said forward carriage; and a microprocessor control system interfaced with said forward and rearward carriage actuators;

wherein said forward roof component is movable responsive to said microprocessor control system by said forward carriage actuator between a seated position whereat said forward roof component is juxtaposed said rearward roof component to a second position whereat said rear end of said forward roof component is aligned proximally with respect to said front end of said rearward roof component; further wherein said forward and rearward roof components are movable responsive to said microprocessor control system in a conjoined state by said rearward carriage actuator such that said forward roof component is movable between substantially said second position and a deployed position adjacent a windshield trim.

2. The apparatus of claim 1, further comprising a joinder assembly to selectively conjoin said forward and rearward roof components, said joinder assembly comprising:

a joinder actuator connected with said microprocessor control system;

a plurality of threaded fasteners connected with one of said rear end of said forward roof component and said front end of said rearward roof component;

a plurality of threaded bores located at the other of said rear end of said forward roof component and said front end of said rearward roof component for respectively receiving threadably therein said plurality of threaded fasteners; and a joinder linkage transmissionally connected between said joinder actuator and said plurality of threaded fasteners.

3. The apparatus of claim 1, further comprising an affixment assembly for affixing the front end of the forward roof component to a windshield trim, said affixment assembly comprising:

an affixment actuator connected with said microprocessor control system;

a plurality of latches connected with said front end of forward roof component; and an affixment linkage transmissionally connected between said affixment actuator and said plurality of latches.

4. The apparatus of claim 1, further comprising a tonneau cover actuator assembly for selectively covering a selected portion of said forward and rearward roof components when said forward roof component is seated juxtaposed said rearward roof component, said tonneau cover actuator assembly comprising:

a tonneau cover; and a tonneau cover actuator connected with said microprocessor control system;

wherein said tonneau cover actuator selectively deploys and retracts said tonneau cover responsive to said microprocessor control system.

5. The apparatus of claim 2, further comprising an affixment assembly for affixing the front end of the forward roof component to a windshield trim, said affixment assembly comprising:

an affixment actuator connected with said microprocessor control system;

a plurality of latches connected with said front end of said forward roof component; and an affixment linkage transmissionally connected between said affixment actuator and said plurality of latches.

6. The apparatus of claim 5, further comprising a tonneau cover actuator assembly for selectively covering a selected portion of said forward and rearward roof components when said forward roof component is seated juxtaposed said rearward roof component, said tonneau cover actuator assembly comprising:

a tonneau cover; and a tonneau cover actuator connected with said microprocessor control system;

wherein said tonneau cover actuator selectively deploys and retracts said tonneau cover responsive to said microprocessor control system.

7. The apparatus of claim 2, further comprising a tonneau cover actuator assembly for selectively covering a selected portion of said forward and rearward roof components when said forward roof component is seated juxtaposed said rearward roof component, said tonneau cover actuator assembly comprising:

a tonneau cover; and a tonneau cover actuator connected with said microprocessor control system;

wherein said tonneau cover actuator selectively deploys and retracts said tonneau cover responsive to said microprocessor control system.

* * * * *